(12) United States Patent
Borisavljevic

(10) Patent No.: US 7,808,201 B2
(45) Date of Patent: Oct. 5, 2010

(54) SENSORLESS FIELD ORIENTED CONTROLLER FOR TWO-PHASE MOTOR

(75) Inventor: Ana Borisavljevic, Marina Del Rey, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/448,614

(22) Filed: Jun. 7, 2006

(65) Prior Publication Data

US 2006/0279248 A1    Dec. 14, 2006

Related U.S. Application Data

(60) Provisional application No. 60/689,134, filed on Jun. 9, 2005.

(51) Int. Cl.
*H02P 6/00*    (2006.01)

(52) U.S. Cl. .................. 318/723; 318/700; 318/503; 318/400.01; 318/400.02; 318/400.04; 318/704; 388/800; 388/801; 388/803; 388/804; 388/805

(58) Field of Classification Search .......... 318/723, 318/503, 704, 700, 400.01, 400.04; 388/800, 388/801, 803, 804, 805, 806
See application file for complete search history.

(56) References Cited

U.S. PATENT DOCUMENTS

| | | | | |
|---|---|---|---|---|
| 3,796,935 A | * | 3/1974 | Blaschke | 318/801 |
| 3,904,942 A | * | 9/1975 | Holtz | 318/135 |
| 4,808,903 A | * | 2/1989 | Matsui et al. | 318/800 |
| 5,105,141 A | * | 4/1992 | Ernest | 318/805 |
| 5,298,847 A | * | 3/1994 | Kerkman et al. | 318/800 |
| 5,502,360 A | * | 3/1996 | Kerkman et al. | 318/805 |
| 5,585,709 A | * | 12/1996 | Jansen et al. | 318/807 |
| 6,018,225 A | * | 1/2000 | Garces | 318/798 |
| 6,910,389 B2 | | 6/2005 | Ho | |
| 7,109,742 B2 | | 9/2006 | de Larminat et al. | |
| 7,208,908 B2 | * | 4/2007 | Anghel | 318/712 |

FOREIGN PATENT DOCUMENTS

EP    1 298 787    4/2003

OTHER PUBLICATIONS

Bimal Bose, "Power Electronics and Variable Frequency Drives," IEEE Computer Society Press, pp. 235-236 and 301-307, Oct. 1996.

(Continued)

*Primary Examiner*—Rita Leykin
*Assistant Examiner*—Renata McCloud
(74) *Attorney, Agent, or Firm*—Farjami & Farjami LLP

(57) ABSTRACT

A power converter circuit for providing maximum utilization of a DC bus voltage to a two-phase Permanent Magnet Synchronous Motor (PMSM) is disclosed. The circuit includes first, second, and third nodes, each node being the junction between series connected high and low side switches connected across a DC bus; a PMSM having first and second windings and a star point at which the first and second windings are coupled to each other, the first winding having a terminal connected to the first node, the second winding having a terminal connected to the second node, and the star point being connected to the third node; and a controller for performing a three-point Pulse Width Modulation (PWM) coupled to a gate of each switch.

20 Claims, 5 Drawing Sheets

OTHER PUBLICATIONS

Joachim Holtz, et al., "Identification and Compensation of Torque Ripple in High-Precision Permanent Magnet Motor Drives," IEEE Transactions on Industrial Electronics, vol. 43, No. 2, pp. 309-320, 1996.

one-page summary in English of the German Office Action dated Aug. 19, 2008.

German Office Action issued Aug. 19, 2008 in corresponding German Application No. 11 2006 001 522.2-32.

Yang, et al., "Control of a Two-Phase Linear Stepping Motor with Three-Phase Voltage Source Inverter," Electric Machines and Drives Conference 2003, IEEE International, vol. 3, 1-4, pp. 1720-1725 (Jun. 2003).

Obermeier, "Modeling of a permanent magnet disk stepper motor and sensorless field oriented speed control using an extended Kalman filter," Power Electronics and Drive Systems 1997, International Conference on Proceedings, vol. 2, 26-29, pp. 714-720 (May 1997).

Yang, "Active damping control of hybrid stepping motor," Power Electronics and Drive Systems 2001, 4th IEEE International Conference on Proceedings, vol. 2, 22-55, pp. 749-754 (Oct. 2001).

* cited by examiner

SENSORLESS FIELD ORIENTED CONTROLLER FOR TWO-PHASE MOTOR

CROSS-REFERENCE TO RELATED APPLICATION

This application is based on and claims the benefit of U.S. Provisional Application Ser. No. 60/689,134, filed on Jun. 9, 2005, entitled SENSORLESS FIELD ORIENTED CONTROLLER FOR TWO-PHASE MOTOR, to which a claim of priority is hereby made and the disclosure of which is incorporated by reference.

BACKGROUND OF THE INVENTION

The present invention relates to two-phase Permanent Magnet Synchronous Motors (PMSM), and more particularly to a strategy that provides maximum utilization of a DC bus voltage by employing a three-point Pulse Width Modulation (PWM).

Motor drives are used in a vast range of applications such as fans, pumps, compressors, washing machines, and etc. Such applications require motor drives to have high efficiency, low noise, and robustly stable operation. A two-phase Permanent Magnet Synchronous Motor (PMSM) has been recently introduced by motor manufacturers as an alternative to a well established but more expensive three-phase PMSM.

SUMMARY OF THE INVENTION

It is an object of the present invention to provide a strategy to control the two-phase PMSM.

In accordance with the present invention, a power converter circuit for providing maximum utilization of a DC bus voltage to a two-phase Permanent Magnet Synchronous Motor (PMSM) is disclosed. The circuit includes first, second, and third nodes, each node being the junction between series connected high and low side switches connected across a DC bus; the circuit being adapted to be coupled to a PMSM having first and second windings and a star point at which the first and second windings are coupled to each other, the first winding having a terminal connected to the first node, the second winding having a terminal connected to the second node, and the star point being connected to the third node; and a controller for performing a three-point Pulse Width Modulation (PWM) coupled to a gate of each switch.

The present invention improves over the prior art in that it provides PWM control of the PMSM neutral point, which yields a better utilization of the DC bus voltage than a simple connection of the neutral point to a capacitor split DC bus voltage.

Other features and advantages of the present invention will become apparent from the following description of the invention that refers to the accompanying drawings.

DETAILED DESCRIPTION OF EMBODIMENTS OF THE INVENTION

Figure 1:
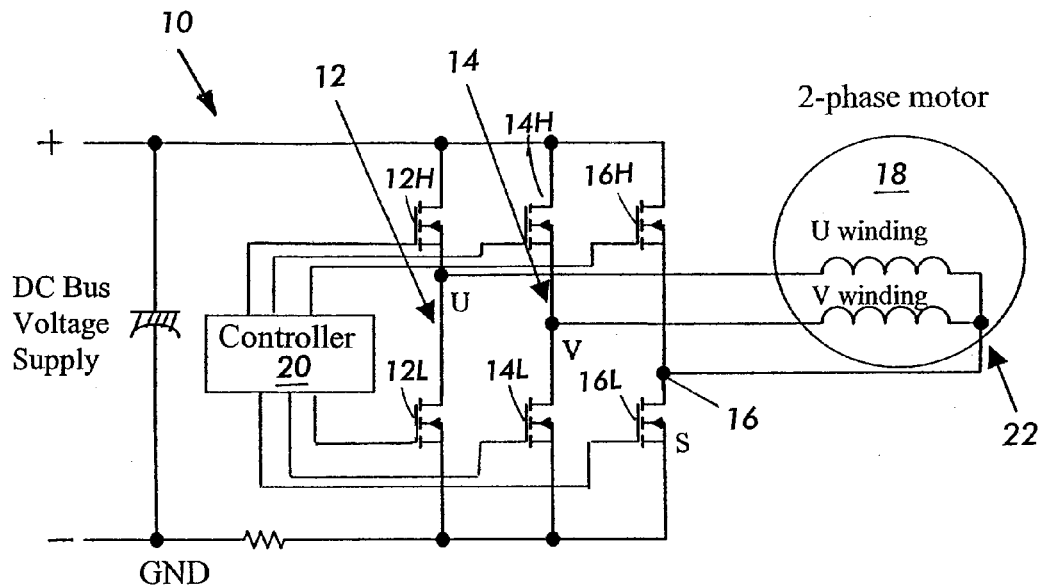
FIG. 1 is a diagram of a two-phase synchronous motor drive controlled by a three-point Pulse Width Modulation according to the invention.

FIG. 1 illustrates a circuit 10 that includes a two-phase non-salient PMSM 18 controlled by a three-point PWM. The circuit 10 further includes a U winding switching node 12 having a U winding of the motor 18 coupled between the in series connected high and low side switches 12H and 12L; a V winding switching node 14 having a V winding of the motor 18 coupled between the in series connected high and low side switches 14H and 14L; and an S switching node 16 having a star point 22 interconnecting the U and V windings of the two-phase motor 18 coupled between the in series connected high and low side switches 16H and 16L. The nodes 12, 14, and 16 and their high and low side switches are controlled by a controller 20. The circuit 10 is powered by a DC bus voltage supply.

Figure 2:
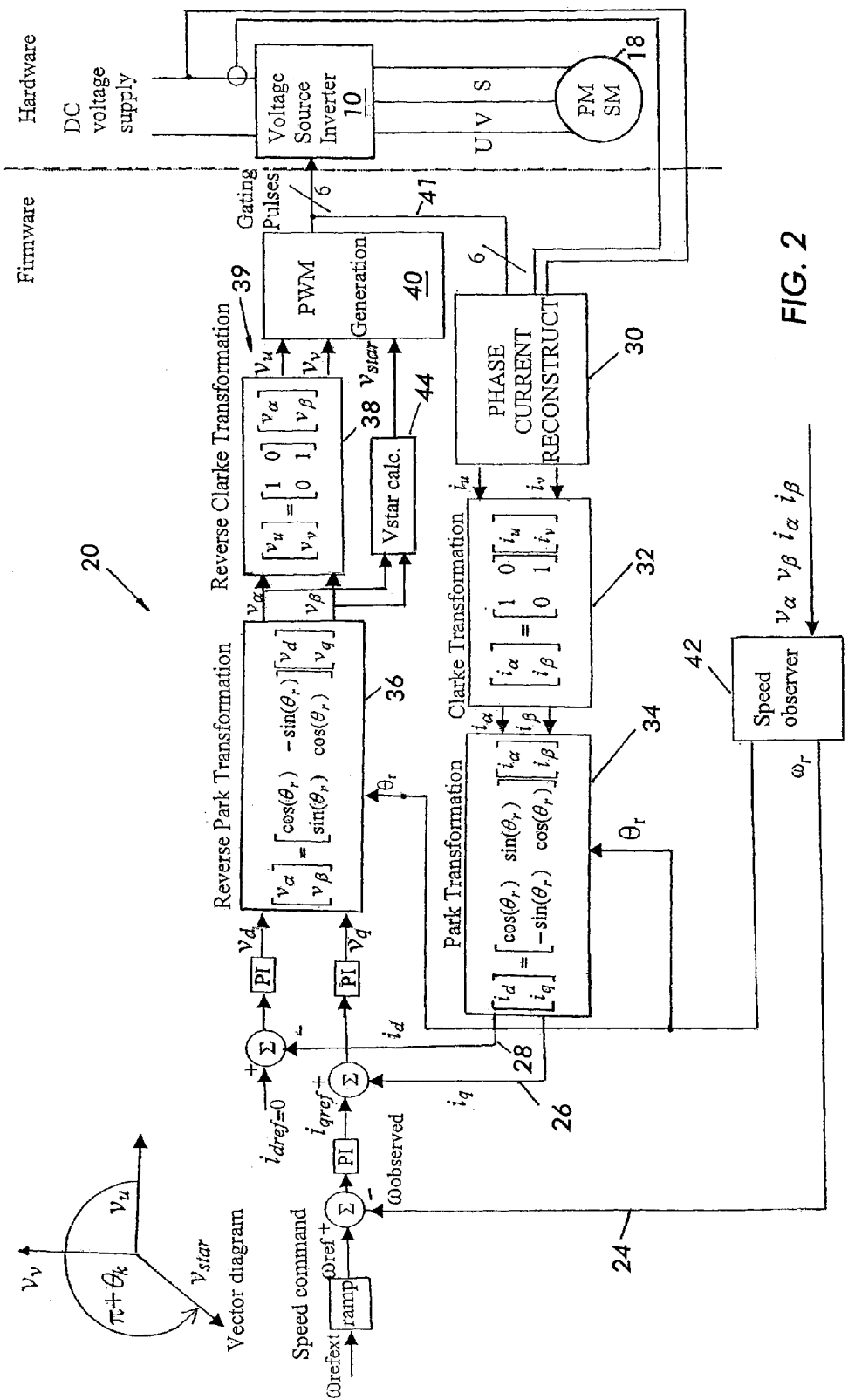
FIG. 2 is a block diagram of a sensorless field oriented controller for a two-phase motor in a three-point modulation.

FIG. 2 illustrates the sensorless field oriented controller 20 that is based on the Field Oriented Control (FOC) principle described in "Power Electronics and Variable Frequency Drives", *IEEE Computer Society Press*, October 1996, by Bimal Bose ("Bose"). The controller 20 includes an outer speed loop and two inner current loops. The speed of the motor 18 is regulated to be equal to a command value provided by the action of an outer speed loop 24. One inner current loop 26 regulates a quadrature component of the motor current $i_q$ and the other inner current loop 28 regulates a direct component of the motor current $i_d$. The motor current $i_d$ is the equivalent motor stator current projected onto the d-axis, which is aligned with the rotor field, and $i_q$ is the equivalent motor stator current projected on the q-axis, which is perpendicular to the rotor field (see Bose).

A model of the PMSM motor in d-q coordinates is given by the following equations as described in "Mathworks: SimPowerSystems Library" for Simulink, which may be found on the Internet at mathworks.com:

$$\frac{d}{dt}i_d = \frac{1}{L_d}v_d - \frac{R}{L_d}i_d + \frac{L_q}{L_d}p\omega_r i_q \tag{1}$$

$$\frac{d}{dt}i_q = \frac{1}{L_q}v_q - \frac{R}{L_q}i_q - \frac{L_d}{L_q}p\omega_r i_d - \frac{\lambda p\omega_r}{L_q} \tag{2}$$

$$T_e = 1.5p[\lambda i_q + (L_d - L_q)i_d i_q] \tag{3}$$

$$\frac{d}{dt}\omega_r = \frac{1}{J}(T_e - F\omega_r - T_m) \tag{4}$$

-continued $$\frac{d\theta}{dt} = \omega_r \quad (5)$$

where
$L_q$, $L_d$ q and d axis inductances
R Resistance of the stator windings
$i_q$, $i_d$ q and d axis currents
$v_q$, $v_d$ q and d axis voltages
$\omega_r$ Angular velocity of the rotor
λ Amplitude of the flux induced by the permanent magnets of the rotor in the stator phases
p Number of pole pairs
$T_e$ Electromagnetic torque
J Combined inertia of rotor and load
F Combined viscous friction of rotor and load
$\theta_r$ Rotor angular position
$T_m$ Shaft mechanical torque The inner current loops 26 and 28 of the controller 20 calculate values of motor winding voltages $v_v$ and $v_u$ (39) with respect to the star point 22 (FIG. 1) of the motor 18, averaged on one switching period of the power converter circuit 10 (FIG. 1). The inner current loops determine quadrature component of the motor current $i_q$ and the direct component of the motor current $i_d$ as follows. A phase current reconstruction section 30 receives the six gate pulse signals 41 provided to the node 12, 14, and 16 switches and the DC bus voltage supply current and provides the U and V winding current values $i_u$ and $i_v$ to section 32. Section 32 performs a Clarke transformation on the $i_u$ and $i_v$ current values, as follows:

$$\begin{bmatrix} i_\alpha \\ i_\beta \end{bmatrix} = \begin{bmatrix} 1 & 0 \\ 0 & 1 \end{bmatrix} \begin{bmatrix} i_u \\ i_v \end{bmatrix}$$

outputting $i_\alpha$ and $i_\beta$ to section 34, where the Park transformation is performed as follows:

$$\begin{bmatrix} i_d \\ i_q \end{bmatrix} = \begin{bmatrix} \cos(\theta_r) & \sin(\theta_r) \\ -\sin(\theta_r) & \cos(\theta_r) \end{bmatrix} \begin{bmatrix} i_\alpha \\ i_\beta \end{bmatrix}$$

producing the $i_q$ and $i_d$ values. These values are then transformed into voltages $v_q$ and $v_d$ and provided to section 36 to be reverse Park transformed as follows:

$$\begin{bmatrix} v_\alpha \\ v_\beta \end{bmatrix} = \begin{bmatrix} \cos(\theta_r) & -\sin(\theta_r) \\ \sin(\theta_r) & \cos(\theta_r) \end{bmatrix} \begin{bmatrix} v_d \\ v_q \end{bmatrix}$$

providing voltage values $v_\alpha$ and $v_\beta$ to section 38, where the reverse Clarke transformation $$\begin{bmatrix} v_u \\ v_v \end{bmatrix} = \begin{bmatrix} 1 & 0 \\ 0 & 1 \end{bmatrix} \cdot \begin{bmatrix} v_\alpha \\ v_\beta \end{bmatrix}$$

provides the voltages $v_v$ and $v_u$ to the PWM section 40 for generating the gate signals for driving the switches controlling the U and V windings of the PMSM 18.

Figure 3:
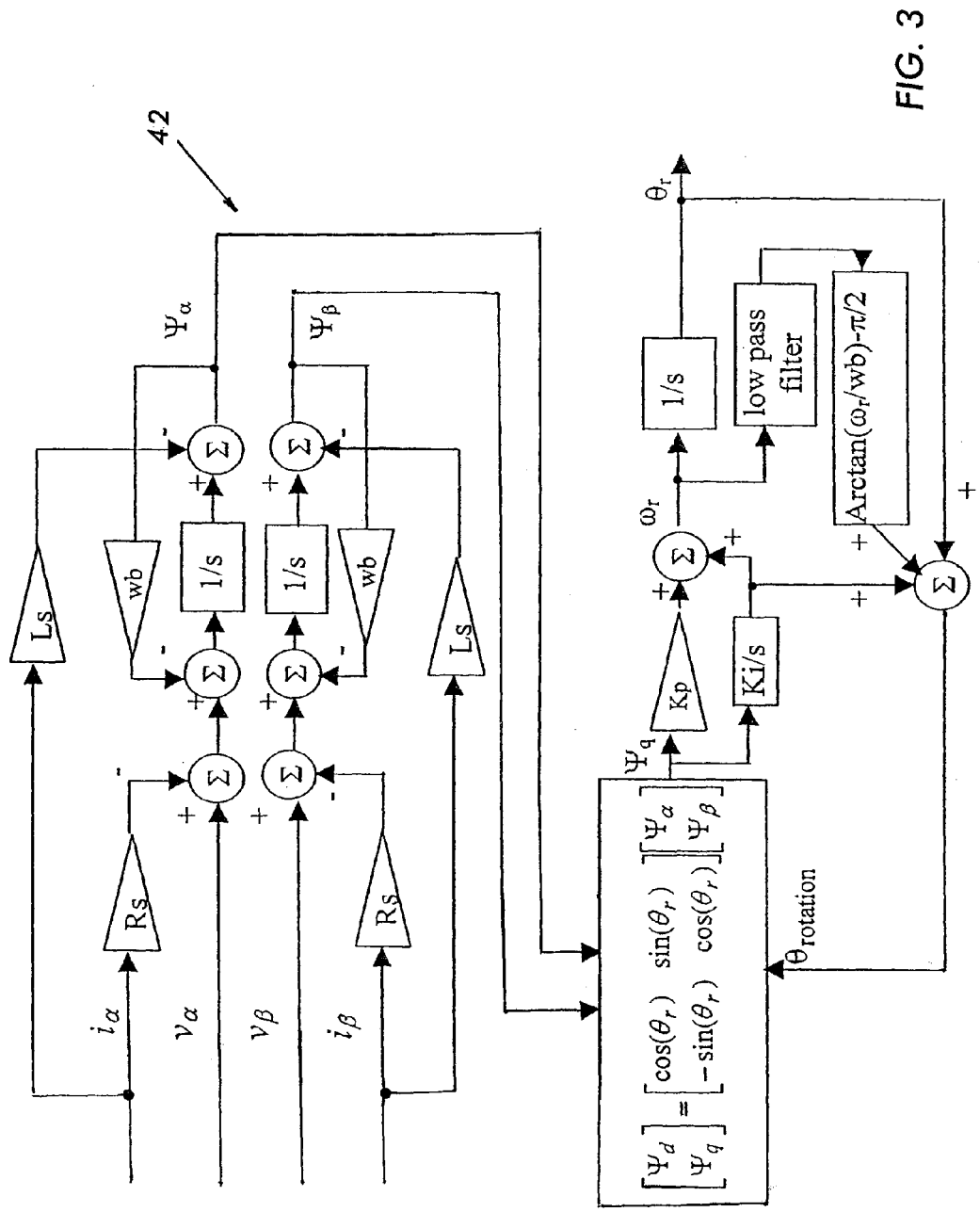
FIG. 3 is a block diagram of the speed observer of the sensorless field oriented controller.

Additionally, a speed observer section 42 of the outer speed loop receives transformation currents $i_\alpha$ and $i_\beta$ from section 32 and transformation voltages $v_\alpha$ and $v_\beta$ from section 36 and outputs an angular velocity of a rotor $\omega_r$ as a reference in the setting of the speed and an angular position of the rotor $\theta_r$ to the Park and reverse Park transformation sections 34 and 36. Details of the speed observer section 42 are illustrated in FIG. 3. One example of the speed observer section 42 is described in U.S. Pat. No. 6,910,389.

The inventive control strategy also controls an average voltage $v_{star}$ on the switching period of the motor's star point 22 with respect to the GND. Compared to motor time constants, the node 12, 14, and 16 switches in the power converter circuit 10 are switched at a high frequency and the average of converter's 22 output voltage is regulated to be equal to the commanded values of $v_v$, $v_u$, and $v_{star}$.

Voltages applied across the windings U and V differ by π/2 in phase angle. In a conventionally utilized control strategy for a two-phase motor, the voltage of the motor's star point 22 is fixed at mid DC bus voltage by a capacitor divider. In this configuration, neglecting voltage drops across the wires and power switches, the maximum instantaneous voltage that can be generated across the motor winding is equal to a half of the DC bus voltage.

If the voltage of the star point is not fixed, but instead modulated at an appropriate phase angle with respect to the winding voltages, the maximum instantaneous voltage which can be generated across the motor winding increases. The optimum modulation function for the star point voltage, in terms of utilization of the DC bus voltage, is found to be the following:

$$v_{star} = 0.5 \cdot V_{DC\,bus} - 0.5 \cdot (v_v + v_u)$$

This calculation of the $v_{star}$ voltage is performed in section 44, which receives its input from voltages $v_\alpha$ and $v_\beta$ from section 36.

Figure 7:
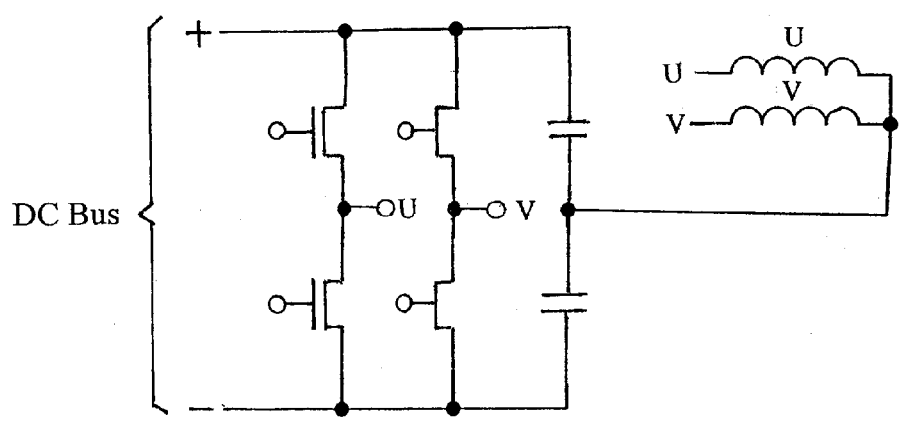
FIG. 7 shows the prior art circuit.

As described above, the controller 20 performs pulse width modulation (PWM) control of all three points 12, 14, and 16 driving a two-phase motor 18, i.e., both phases U and V as well as the neutral point 22 of the motor. Proper PWM control of the motor's neutral point 22 yields a better utilization of the DC bus voltage than a simple connection of the neutral point to a capacitor split DC bus voltage. The prior art circuit is shown in FIG. 7.

Figure 4:
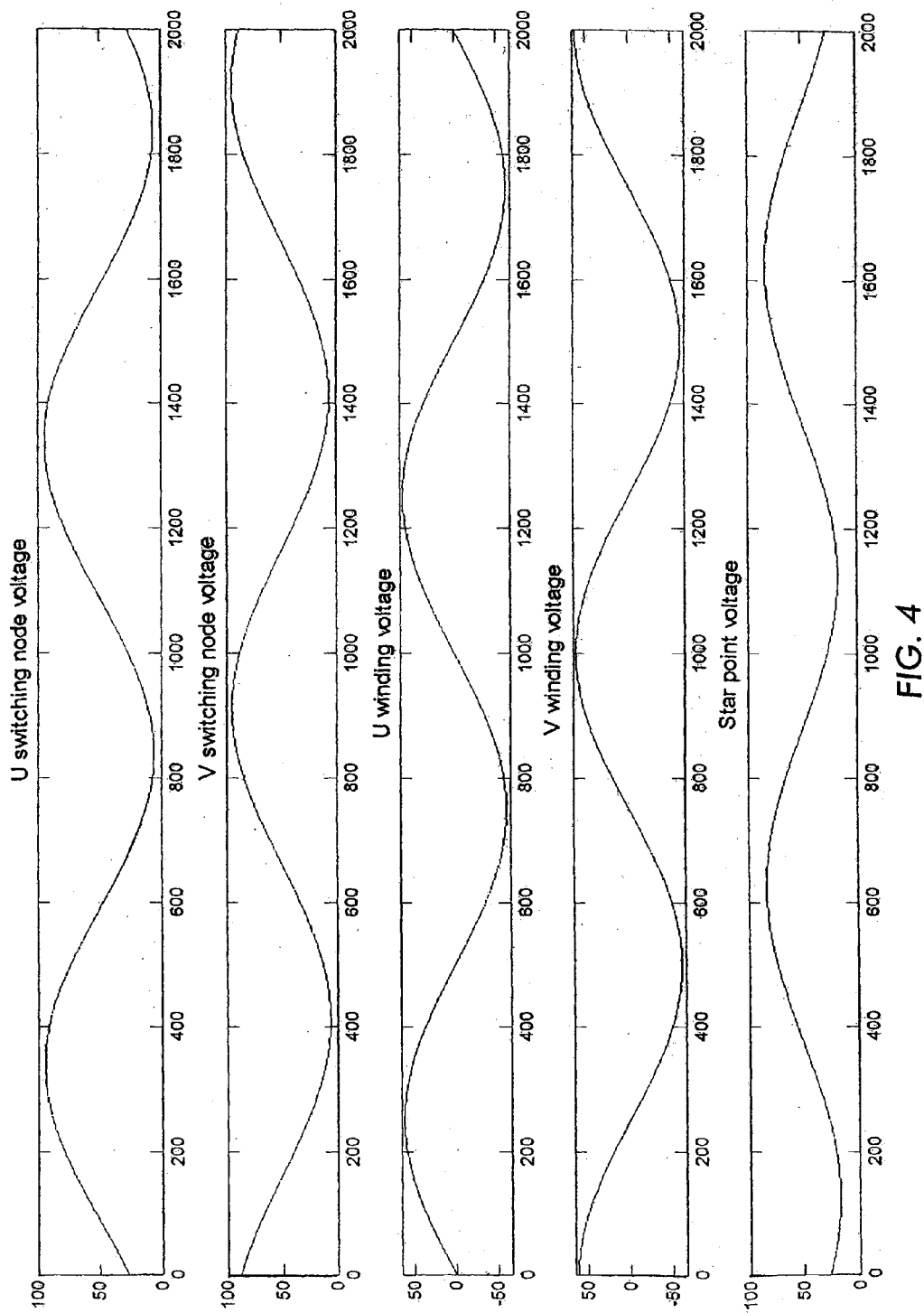
FIG. 4 is a graph of simulated waveforms of average drive voltages for a DC bus voltage of 100V, winding voltage of 63V peak and control described by a $v_{star}$ calculation.

FIG. 4 illustrates simulated waveforms of average drive voltages for a DC bus voltage of 100V, winding voltage of 63V peak, and control as described above including control of $v_{star}$ by the above-presented formula. The illustrated voltages are for K=0.3 and $\kappa_k$=45. All voltages are averaged on the switching period. In this Figure the available winding voltage exceeds half of the DC bus voltage by 26%. Therefore the utilization of the DC bus voltage is increased by 26% compared to the conventionally utilized control strategy.

Figure 5:
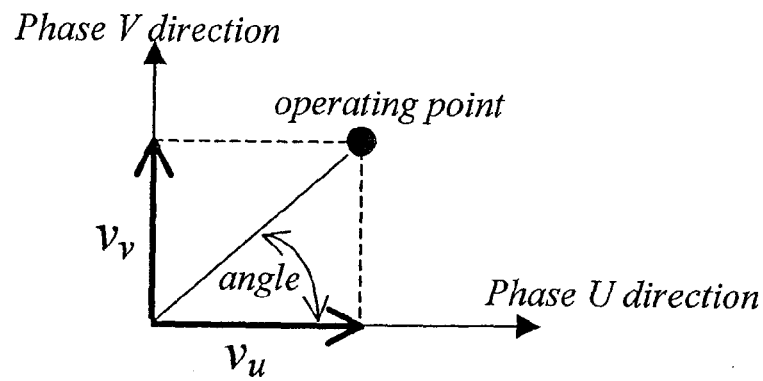
FIG. 5 is a diagram defining an angle of an operating point.

FIG. 5 illustrates the implementation of a two-phase Space Vector PWM for the inventive control strategy for a two-phase PMSM. In the two-phase Space Vector PWM only two out of three legs in the power converter are switched during each given switching period. The third leg does not switch but instead is left in the initial position. This is beneficial because switching losses reduce by a third. Depending on the angle of the operating point, as shown in FIG. 5, there are 6 sectors of operation.

The controller 20 generates gating pulses according to a pattern displayed in Table 1.

TABLE 1

Pattern for generation of gating pulses for the proposed control strategy and two-phase SVPWM

| Sectors | 1 | 2 | 3 | 4 | 5 | 6 |
|---|---|---|---|---|---|---|
| Angle value | angle < $\pi/4$ | $\pi/4$ < angle < $\pi/2$ | $\pi/2$ < angle < $\pi$ | $\pi$ < angle < $5\pi/4$ | $5\pi/4$ < angle < $3\pi/2$ | $3\pi/2$ < angle < $2\pi$ |
| $\dfrac{T_a}{0.5 \cdot T_s}$ | $(D_{us} - D_{vs})$ | $(D_{vs} - D_{us})$ | $D_{vs}$ | $-D_{vs}$ | $-D_{us}$ | $D_{us}$ |
| $\dfrac{T_b}{0.5 \cdot T_s}$ | $D_{vs}$ | $D_{us}$ | $-D_{us}$ | $(D_{vs} - D_{us})$ | $(D_{us} - D_{vs})$ | $-D_{vs}$ |
| Gating pattern | Phase 1 = u<br>Phase 2 = v<br>Phase 3 = s | Phase 1 = v<br>Phase 2 = u<br>Phase 3 = s | Phase 1 = v<br>Phase 2 = s<br>Phase 3 = u | Phase 1 = s<br>Phase 2 = v<br>Phase 3 = u | Phase 1 = s<br>Phase 2 = u<br>Phase 3 = v | Phase 1 = u<br>Phase 2 = s<br>Phase 3 = v |

In Table 1, $D_{us}$ and $D_{vs}$ are defined as:

$$D_{us} = \frac{v_u}{V_{DC\_bus}} \text{ and } D_{vs} = \frac{v_v}{V_{DC\_bus}}$$

Figure 6:
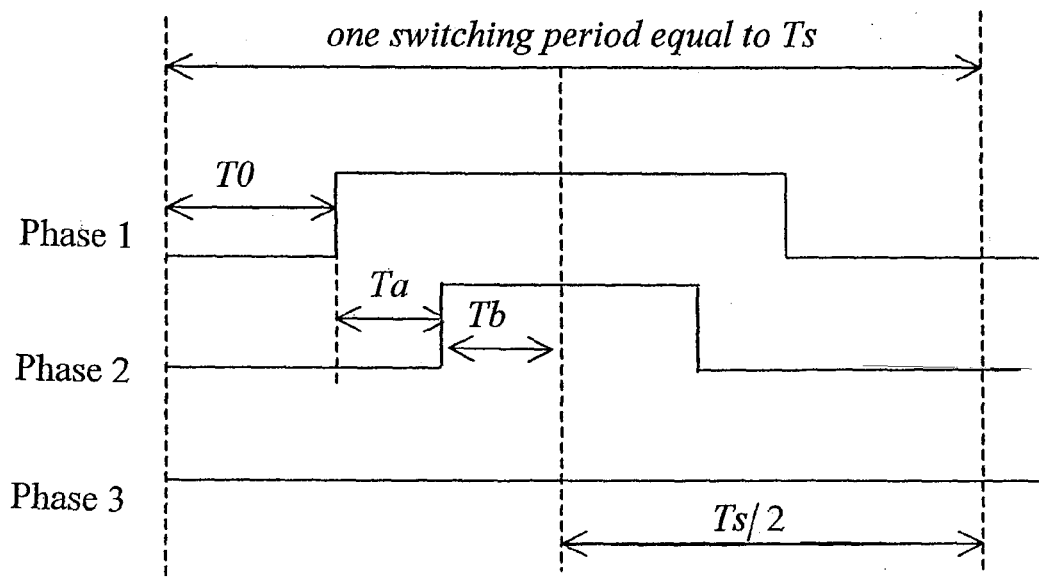
FIG. 6 is a graph showing gating pulses for low switches and two-phase Space Vector PWM gating pulses that are active high.

Finally, FIG. 6 illustrates gating pulses used for the low switches of the power converter circuit 10 of the present invention. It further shows two-phase Space Vector PWM where the gating pulses are active high.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for driving a two-phase Permanent Magnet Synchronous Motor (PMSM), the circuit comprising:

first, second, and third nodes, each node being a junction between series connected high and low side switches connected across a DC bus;

the circuit being adapted to be coupled to a PMSM having first and second windings and a star point at which the windings are coupled to each other, the first winding having a terminal connected to the first node, the second winding having a terminal connected to the second node, and the star point being connected to the third node; and a controller for performing a three-point Pulse Width Modulation (PWM) coupled to a gate of each switch, wherein one of the points is the star point; and wherein the controller operates on the Field Oriented Control (FOC) principle to regulate a speed of the PMSM and includes an outer speed loop and first and second inner current loops; and wherein the first and second inner current loops calculate values of the first and second motor winding voltages $v_v$ and $v_u$ with respect to the star point of the motor averaged on one switching period of the circuit.

2. The circuit of claim 1, wherein the outer speed loop sets the desired speed of the PMSM and the first inner current loop regulates a quadrature component $i_q$ of the motor current and the second inner current loop regulates a direct component $i_d$ of the motor current, the motor current $i_d$ is the equivalent motor stator current projected onto a d-axis aligned with a rotor field, and the motor current $i_q$ is the equivalent motor stator current projected on a q-axis, which is perpendicular to the rotor field.

3. The circuit of claim 2, wherein the inner current loops determine quadrature component $i_q$ of the motor current and the direct component $i_d$ of the motor current by (a) receiving gate pulse signals from each switch and the DC bus voltage supply current, (b) determining $i_u$ and $i_v$ current values of the first and second winding, (c) performing the Clarke transformation on the current values $i_u$ and $i_v$, in accordance with $$\begin{bmatrix} i_\alpha \\ i_\beta \end{bmatrix} = \begin{bmatrix} 1 & 0 \\ 0 & 1 \end{bmatrix} \begin{bmatrix} i_u \\ i_v \end{bmatrix}$$

to determine current values $i_\alpha$ and $i_\beta$, (d) performing the Park transformation on the determined current values $i_\alpha$ and $i_\beta$, in accordance with $$\begin{bmatrix} i_d \\ i_q \end{bmatrix} = \begin{bmatrix} \cos(\theta_r) & \sin(\theta_r) \\ -\sin(\theta_r) & \cos(\theta_r) \end{bmatrix} \begin{bmatrix} i_\alpha \\ i_\beta \end{bmatrix},$$

to determine current values $i_q$ and $i_d$, (e) converting the current values $i_q$ and $i_d$ into corresponding voltage values $v_q$ and $v_d$, (f) performing the reverse Park transformation on the voltage values $v_q$ and $v_d$, in accordance with $$\begin{bmatrix} v_\alpha \\ v_\beta \end{bmatrix} = \begin{bmatrix} \cos(\theta_r) & -\sin(\theta_r) \\ \sin(\theta_r) & \cos(\theta_r) \end{bmatrix} \begin{bmatrix} v_d \\ v_q \end{bmatrix},$$

to determine voltage values $v_\alpha$ and $v_\beta$, and (g) performing the reverse Clarke transformation on the voltage values $v_\alpha$ and $v_\beta$, in accordance with $$\begin{bmatrix} v_u \\ v_v \end{bmatrix} = \begin{bmatrix} 1 & 0 \\ 0 & 1 \end{bmatrix} \cdot \begin{bmatrix} v_\alpha \\ v_\beta \end{bmatrix},$$

to determine voltages $v_v$ and $v_u$ required to drive the PMSM at the desired speed sets by the outer control loop.

4. The circuit of claim 1, wherein the determined voltages $v_v$ and $v_u$ are used to generate the three-point PWM for driving the first and second windings.

5. The circuit of claim 1, wherein an average voltage $V_{star}$ on the switching period of the star point with respect to the GND is regulated to be equal to the set values of $v_v$, $v_u$, and $V_{star}$.

6. The circuit of claim 1, further including a speed observer circuit having an input of voltages $v_\alpha$ and $v_\beta$ and currents $i_\alpha$ and $i_\beta$ and outputting an angular position of a rotor $\theta_r$ and angular velocity of the rotor $\omega_r$.

7. The circuit of claim 1, wherein average output voltages of said circuit are regulated to be equal to set values of $v_v$, $v_u$ and $V_{star}$.

8. A circuit for driving a two-phase Permanent Magnet Synchronous Motor (PMSM), the circuit comprising:
   first, second, and third nodes, each node being a junction between series connected high and low side switches connected across a DC bus;
   the circuit being adapted to be coupled to a PMSM having first and second windings and a star point at which the windings are coupled to each other, the first winding having a terminal connected to the first node, the second winding having a terminal connected to the second node, and the star point being connected to the third node; and
   a controller for performing a three-point Pulse Width Modulation (PWM) coupled to a gate of each switch, wherein one of the points is the star point;
   wherein the voltage of the star point is modulated at a phase angle with respect to the voltages of the first and second windings, thereby increasing a maximum instantaneous voltage that can be generated across the first and second windings; and
   wherein the modulation of the star point voltage is determined as $v_{star}=0.5 \cdot V_{DC\,bus}-0.5 \cdot (v_v+v_u)$.

9. A method of driving a two-phase Permanent Magnet Synchronous Motor (PMSM), the method comprising the steps of:
   providing a circuit having a controller for performing a three-point Pulse Width Modulation (PWM), for driving a PMSM having first and second windings and a star point at which the windings are coupled to each other, and first, second, and third nodes, each node being a junction between series connected high and low side switches connected across a DC bus, the controller having a connection to a gate of each switch;
   connecting the first winding to the first node, the second winding to the second node, and the star point to the third node; and
   controlling the voltage applied to the PMSM, wherein the voltage of the star point is controlled along with voltages of the first and second windings;
   wherein the controller operates on the Field Oriented Control (FOC) principle to regulate a speed of the PMSM and includes an outer speed loop and first and second inner current loops; and
   wherein the first and second inner current loops calculate values of the first and second motor winding voltages $v_v$ and $v_u$ with respect to the star point of the motor averaged on one switching period of the circuit.

10. The method of claim 9, wherein the determined voltages $v_v$ and $v_u$ are used to generate three-point PWM for driving the first and second windings.

11. The method of claim 9, wherein an average voltage $V_{star}$ on the switching period of the star point with respect to the GND is regulated to be equal to set values of $v_v$, $v_u$, and $V_{star}$.

12. The method of claim 9, wherein the voltage of the star point is modulated at a phase angle with respect to the voltages of the first and second windings, thereby increasing a maximum instantaneous voltage that can be generated across the first and second windings.

13. The method of claim 12, wherein, the modulation of the star point voltage is determined as $v_{star}=0.5 \cdot V_{DC\,bus}-0.5 \cdot (v_v+v_u)$.

14. The method of claim 9, wherein average output voltages of said circuit are regulated to be equal to set values of $v_v$, $v_u$ and $V_{star}$.

15. A method of driving a two-phase Permanent Magnet Synchronous Motor (PMSM), the method comprising the steps of:
   providing a circuit having a controller for performing a three-point Pulse Width Modulation (PWM), for driving a PMSM having first and second windings and a star point at which the windings are coupled to each other, and first, second, and third nodes, each node being a junction between series connected high and low side switches connected across a DC bus, the controller having a connection to a gate of each switch;
   connecting the first winding to the first node, the second winding to the second node, and the star point to the third node; and
   controlling the voltage applied to the PMSM, wherein the voltage of the star point is controlled along with voltages of the first and second windings;
   wherein the voltage of the star point is modulated at a phase angle with respect to the voltages of the first and second windings, thereby increasing a maximum instantaneous voltage that can be generated across the first and second windings.

16. The method of claim 15, wherein the modulation of the star point voltage is determined as $v_{star}=0.5 \cdot V_{DC\,bus}-0.5 \cdot (v_v+v_u)$.

17. A circuit for driving a two-phase Permanent Magnet Synchronous Motor (PMSM), the circuit comprising:
   first, second, and third nodes, each node being a junction between series connected high and low side switches connected across a DC bus;
   the circuit being adapted to be coupled to a PMSM having first and second windings and a star point at which the windings are coupled to each other, the first winding having a terminal connected to the first node, the second winding having a terminal connected to the second node, and the star point being connected to the third node; and
   a controller for performing a three-point Pulse Width Modulation (PWM) coupled to a gate of each switch, wherein one of the points is the star point;
   wherein the voltage of the star point is modulated at a phase angle with respect to the voltages of the first and second windings, thereby increasing a maximum instantaneous voltage that can be generated across the first and second windings; and
   wherein the controller operates on the Field Oriented Control (FOC) principle to regulate a speed of the PMSM and includes an outer speed loop and first and second inner current loops.

18. The circuit of claim 17, wherein the first and second inner current loops calculate values of the first and second motor winding voltages $v_v$ and $v_u$ with respect to the star point of the motor averaged on one switching period of the circuit.

19. The circuit of claim 18, wherein the outer speed loop sets the desired speed of the PMSM and the first inner current loop regulates a quadrature component $i_q$ of the motor current and the second inner current loop regulates a direct component $i_d$ of the motor current, the motor current $i_d$ is the equivalent motor stator current projected onto a d-axis aligned with a rotor field, and the motor current $i_q$ is the equivalent motor stator current projected on a q-axis, which is perpendicular to the rotor field.

20. The circuit of claim 18, wherein the determined voltages $v_v$ and $v_u$ are used to generate the three-point PWM for driving the first and second windings.

* * * * *

UNITED STATES PATENT AND TRADEMARK OFFICE
CERTIFICATE OF CORRECTION

PATENT NO.         : 7,808,201 B2
APPLICATION NO.    : 11/448614
DATED              : October 5, 2010
INVENTOR(S)        : Borisavljevic Page 1 of 2

It is certified that error appears in the above-identified patent and that said Letters Patent is hereby corrected as shown below:

In the claims, column 6, lines 25-29, " $\begin{bmatrix} i_\alpha \\ i_\beta \end{bmatrix}$ " should be changed to -- $\begin{bmatrix} i_\alpha \\ i_\beta \end{bmatrix}$ --.

In the claims, column 6, lines 33-35, " $\begin{bmatrix} i_d \\ i_q \end{bmatrix}$ " should be changed to -- $\begin{bmatrix} i_d \\ i_q \end{bmatrix}$ --.

In the claims, column 6, lines 33-35, " $\begin{bmatrix} i_\alpha \\ i_\beta \end{bmatrix}$ " should be changed to -- $\begin{bmatrix} i_\alpha \\ i_\beta \end{bmatrix}$ --.

In the claims, column 6, lines 43-45, " $\begin{bmatrix} v_\alpha \\ v_\beta \end{bmatrix}$ " should be changed to -- $\begin{bmatrix} v_\alpha \\ v_\beta \end{bmatrix}$ --.

In the claims, column 6. lines 43-45, " $\begin{bmatrix} v_d \\ v_q \end{bmatrix}$ " should be changed to -- $\begin{bmatrix} v_d \\ v_q \end{bmatrix}$ --.

In the claims, column 6, lines 51-53, " $\begin{bmatrix} v_\alpha \\ v_\beta \end{bmatrix}$ " should be changed to -- $\begin{bmatrix} v_\alpha \\ v_\beta \end{bmatrix}$ --.

In the claims, column 6, line 60, "V$_{star}$" should be changed to --v$_{star}$--.

In the claims, column 7, line 3, "V$_{star}$" should be changed to --v$_{star}$--.

Signed and Sealed this
Twenty-second Day of November, 2011

David J. Kappos
*Director of the United States Patent and Trademark Office*

CERTIFICATE OF CORRECTION (continued)
U.S. Pat. No. 7,808,201 B2

In the claims, column 7, line 39, "voltage" should be changed to --voltages--.

In the claims, column 7, line 64, "$V_{star}$" should be changed to --$v_{star}$--.

In the claims, column 7, line 56, "$V_{star}$" should be changed to --$v_{star}$--.

In the claims, column 7, line 67, "$V_{star}$" should be changed to --$v_{star}$--.

In the claims, column 8, line 61, "on" should be changed to --onto--.